United States Patent [19]

Sung et al.

[11] Patent Number: 5,632,463
[45] Date of Patent: May 27, 1997

[54] MONITOR STAND ASSEMBLY

[75] Inventors: Ki-Hyub Sung; Sung-Gil Cha, both of Suwon, Rep. of Korea

[73] Assignee: Samsung Electronics Co., Ltd., Suwon, Rep. of Korea

[21] Appl. No.: 489,563

[22] Filed: Jun. 12, 1995

[30] Foreign Application Priority Data

Jun. 13, 1994 [KR] Rep. of Korea .................. 94-13616
Jun. 13, 1994 [KR] Rep. of Korea .................. 94-13617
Jun. 13, 1994 [KR] Rep. of Korea .................. 94-13618

[51] Int. Cl.⁶ .................................................. F16M 11/00
[52] U.S. Cl. ..................... 248/371; 248/349.1; 248/921
[58] Field of Search ........................... 248/349.1, 346.06, 248/919–923, 179.1, 181.2, 183.2, 371

[56] References Cited

U.S. PATENT DOCUMENTS

| | | | |
|---|---|---|---|
| 4,554,590 | 11/1985 | Chelin et al. | 248/920 X |
| 4,562,988 | 1/1986 | Bumgardner | 248/349.1 X |
| 4,566,664 | 1/1986 | Donald | 248/349.1 |
| 4,591,123 | 5/1986 | Bradshaw et al. | 248/349 X |
| 4,781,347 | 11/1988 | Dickie | 248/921 X |
| 5,024,415 | 6/1991 | Purens | 248/349.1 |
| 5,037,050 | 8/1991 | Lin et al. | 248/921 X |
| 5,145,134 | 9/1992 | Hashimoto et al. | 248/923 X |
| 5,209,446 | 5/1993 | Kawai | 248/923 X |
| 5,398,903 | 3/1995 | Cho | 248/349.1 |
| 5,465,936 | 11/1995 | Wang | 248/349.1 X |

Primary Examiner—Derek J. Berger
Assistant Examiner—Anita M. King
Attorney, Agent, or Firm—Ladas & Parry

[57] ABSTRACT

A monitor stand assembly includes a lower part and an upper part which can be linked without additional connecting member, resulting in easier assembly and improved productivity. The introduction of an interlocking mechanism for the upper and lower parts of the stand by interlocking selector flanges through an oval cutout, and a rotation-stopping flange for restricting horizontal rotation of the upper part within a flange-rotation-allowable zone, result in smooth monitor rotation as well as more secure monitor positioning after adjustment.

6 Claims, 7 Drawing Sheets

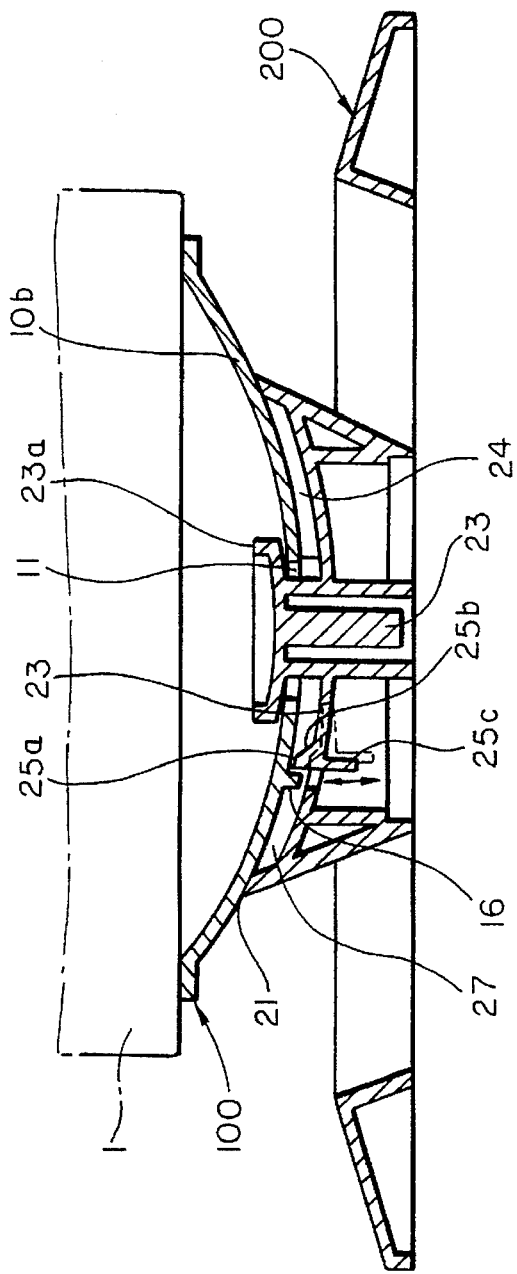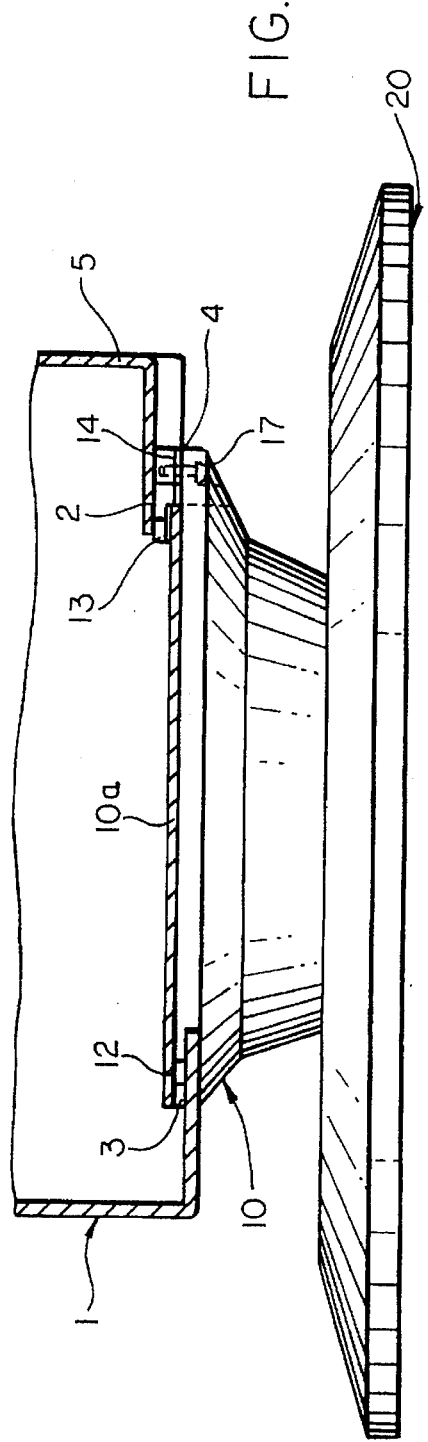

MONITOR STAND ASSEMBLY

BACKGROUND OF THE INVENTION

This invention relates to a monitor stand designed for easier and more secure monitor positioning without drooping and providing for more efficient assembly.

In general, a monitor stand allows the user to adjust the monitor angle within a given range. It is desirable that the stand allows smooth monitor rotation as well as secure monitor positioning after each adjustment.

FIGS. 1 and 2 illustrate the typical structure of many currently available products.

The monitor stand is largely composed of an upper part(100) having a convex ribbed bottom surface 101 and a lower part(200) having a concave spheroidal upper surface 201. A fixture plate(300) is screwed into a boss(202) using a screw 301, allowing the convex bottom surface(101) of the upper part to slide along the concave upper surface(201) of the lower part. Resilient tabs(302) passing through oval cutout(102) of the upper part snap into tab holes(203), to prevent the rotation of a fixture plate(300) while allowing free rotation of the upper part. Then, the entire stand assembly is attached to the bottom of a monitor 1, using a mounting screw 303.

A disadvantage of such a design is that the force required for monitor adjustment is sensitive to the tightness of the screw(301). Loose screws provide weak friction between the upper and lower parts, resulting in unsecure positioning, while too-tight screws make it difficult to adjust the monitor postion. However, it is difficult to maintain regular control of the tightness of each screw in the assembly process, and even optimally tightened screws become loose with usage due to the abrasion of the sliding parts, which results in excessively free rotation of the monitor.

In addition, since the stand is attached only at the rear of the monitor case the heavier front tends to cause the monitor to rotate downward on its own(drooping). Such, rear mounting may also result in a gap between front and rear sections of the monitor case if the rib integrating them is broken.

Moreover, the use of a separate part(i.e., fixture plate 300) for connecting the lower and upper parts of the stand adds to the complexity of the assembly process, resulting in higher manufacturing costs.

SUMMARY OF THE INVENTION

One of the objectives of this invention is to provide a monitor stand composed of an adjustable upper part and a lower supporting part, which not only provides for smooth monitor rotation but also a secure adjusted position.

Another objective of this invention is to prevent the monitor from inherent forward rotation(drooping) due to slippage the heavier front section and provide for the structural integrity of the monitor.

The other objective is to lower the manufacturing cost and increase efficiency, by reducing the number of assembly parts.

To achieve these goals, a rotation-stopping flange has been provided on the bottom surface of a stand upper part along one side of an oval cutout. A stop rib and an elastic rib are introduced to work with the rotation-stopping flange, for restricting rotation of the stand upper part. A selector with flanges which are inserted through the oval cutout and rotate to interlock the upper and lower parts of the stand has been implemented in this invention.

Also, this invention provides a way to prevent monitor drooping by introducing pairs of hook ribs at the top portion of the stand upper part, to be assembled to the bottom of the monitor case.

BRIEF DESCRIPTION OF THE ATTACHED DRAWINGS

FIG. 5A and FIG. 5B show a cross-sectional view and a side view of the monitor stand assembly of FIG. 3 shown assembled respectively;

DETAILED DESCRIPTION OF THE PREFERRED EMBODIMENTS

Figure 1:
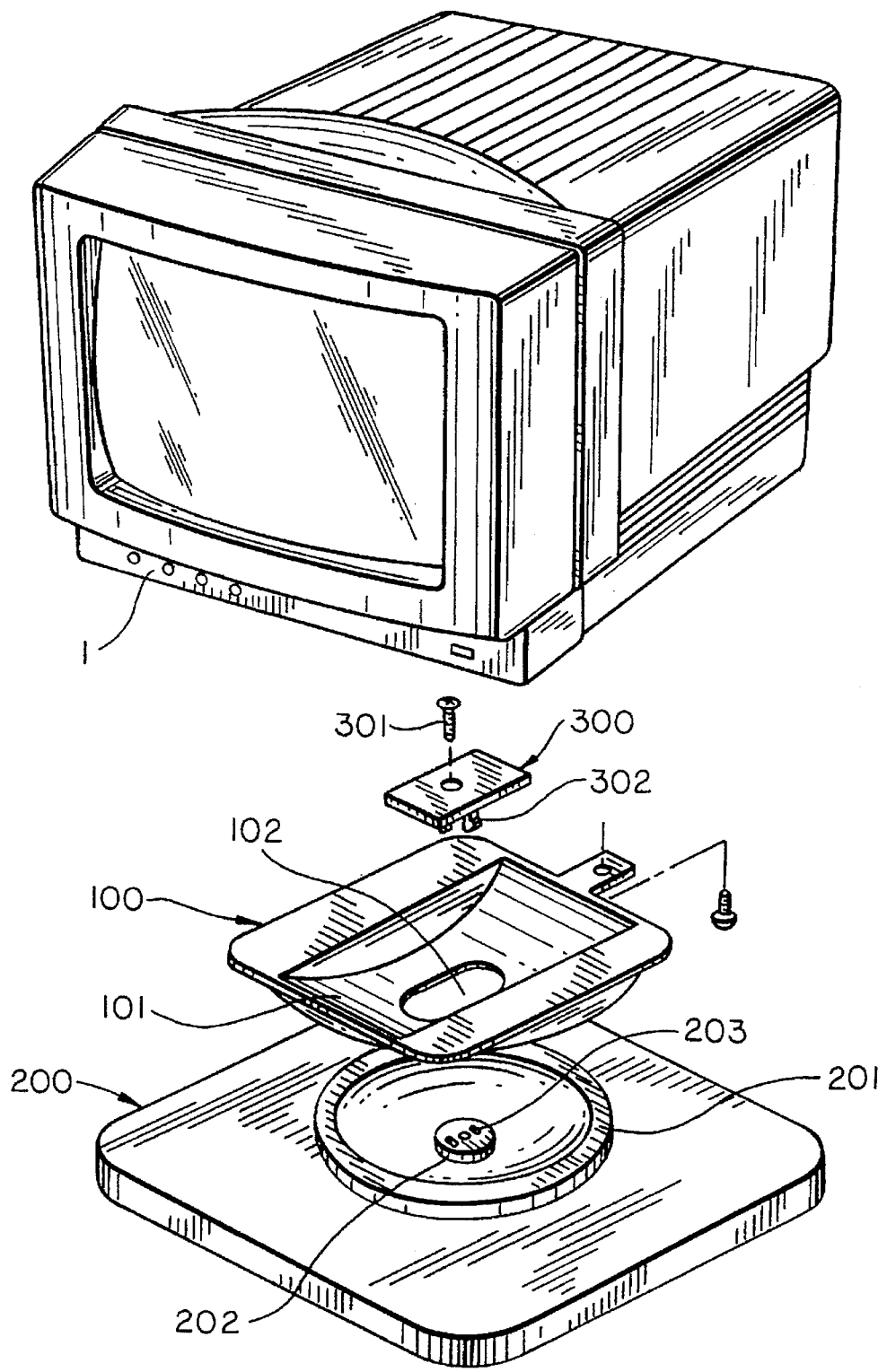
FIG. 1 is an exploded perspective view of a conventional monitor stand assembly.
Figure 2:
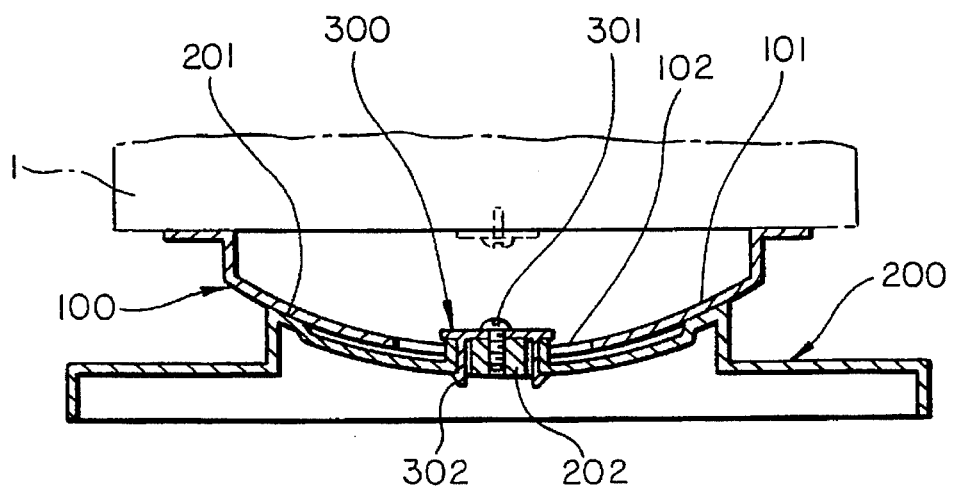
FIG. 2 is a cross-sectional view of the conventional monitor stand assembly of FIG. 1 shown assembled.
Figure 3:
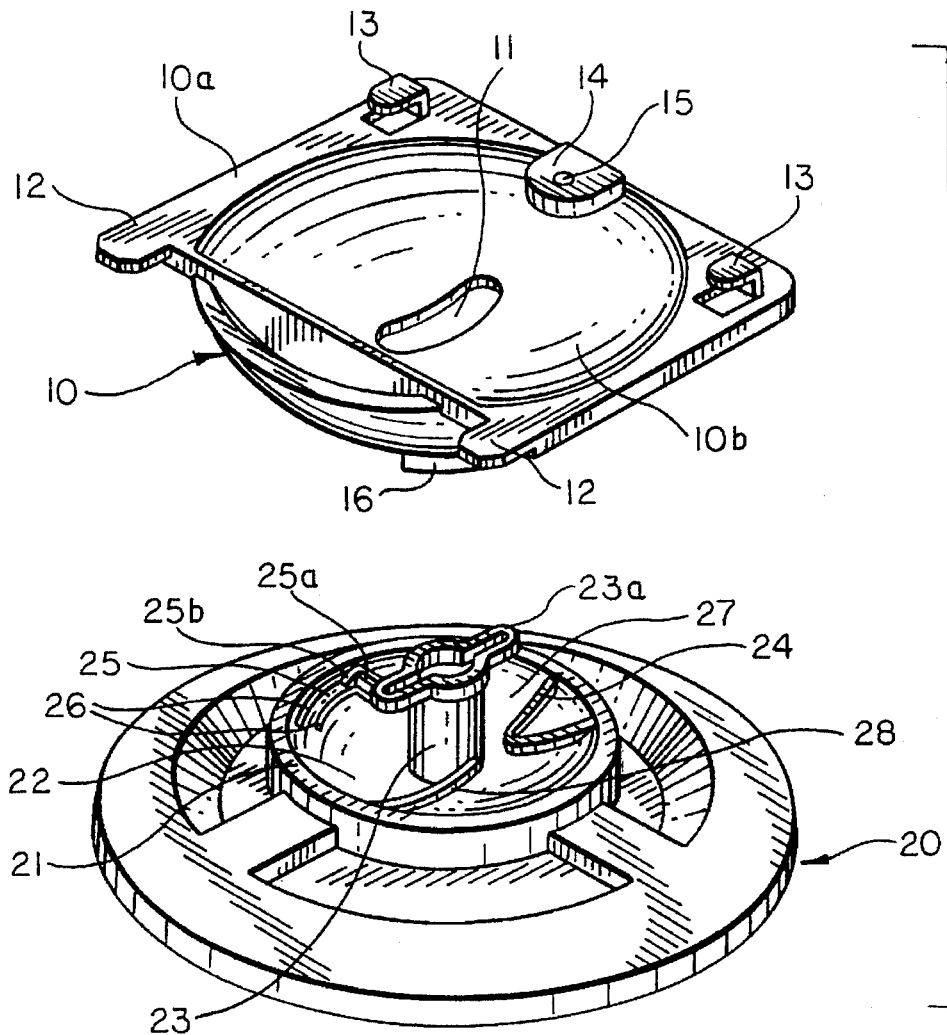
FIG. 3 is an exploded perspective view of the first preferred embodiment of the monitor stand assembly of the present invention.
Figure 4:
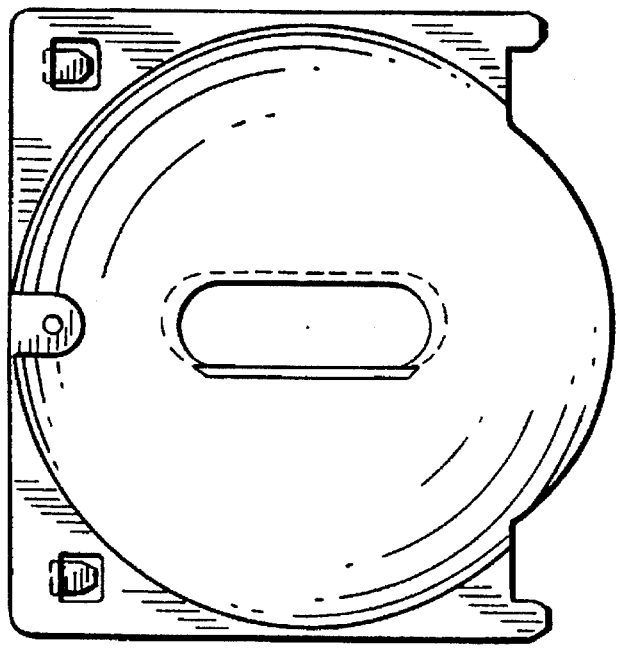
FIG. 4A and FIG. 4B show the bottom view of the monitor stand upper part and the top view of the monitor stand lower part of FIG. 3, respectively.
Figure 4:
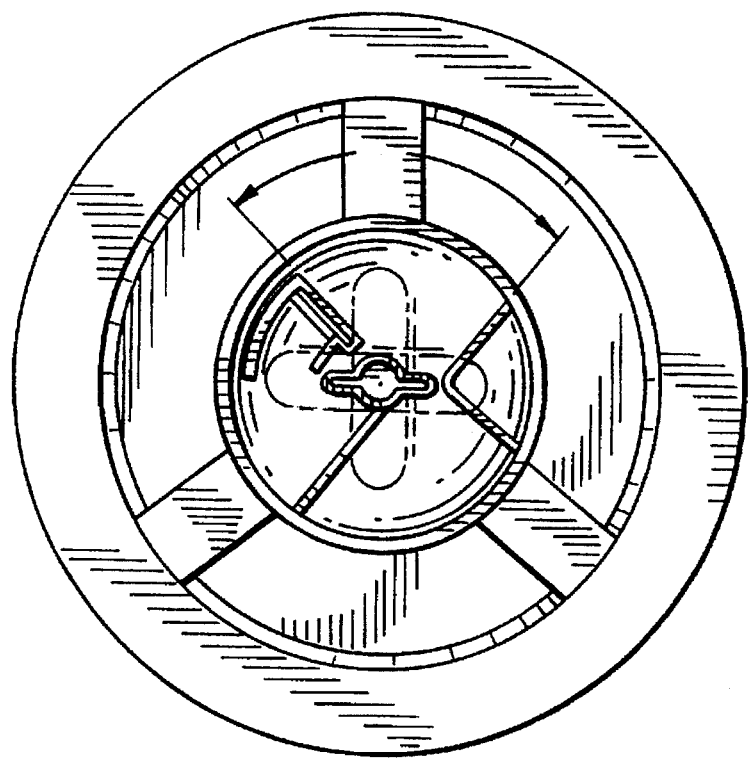

FIGS. 3–5 illustrate the first preferred embodiment of the present invention.

An upper part(10) of the monitor stand is composed of a flat top portion(10a) and a concave bottom portion 10b with an oval cutout(11) at the center. The top portion of the upper part has a pair of connection ribs(12) to be inserted into slots at the front bottom of the monitor case and a pair of hooks(13) to slide into rectangular grooves at the rear bottom of the monitor(see FIG. 5B). A rib(14) with a screw hole(15) at the rear center of the upper pact engages with a step(4) along the rear bottom of the monitor case, to prevent dislocation of the monitor. A rotation-stopping flange(16) is located on one side of the oval cutout(11) on the bottom side of the upper part.

A lower part(20) of the stand broadly comprises a slip ring(21) and a concave surface(22) inside the slip ring and a selector(23) with flanges(23a) which are to be loosely engaged with the upper part through the oval cutout. To restrict the movement of the rotation-stopping flange (16), the concave surface(22) of the lower part is provided with a V-shaped stop rib(24) and an elastic rib(25) having a stop tab(25a) and a ramp(25b).

The elastic rib is a cantilever beam deflecting up and down elastically upon loading with the free end where stop tab(25a) is mounted with ramp(25b). The other end of the elastic rib joins the concave surface(22) of the lower part.

The assembly process of the monitor stand constructed as above will be explained below with reference to FIGS. 5A–5B.

First, the selector flanges are aligned with and inserted through the oval cutout of the upper part. Then, the upper part is rotated clockwise to interlock the upper and lower parts together.

In FIG. 4B, with the selector(23) fully inserted into the oval cutout of the upper part(reference dotted lines), rotate the upper part is rotated clockwise until the rotation-stopping flange moves into a flange-rotation-allowable zone (27). As the upper part(10) rotates, the rotation-stopping flange gradually comes into contact with the ramp on the elastic rib with increasing pressure. As the rotation-stopping flange passes over the stop tap(25a) into the flange-allowable zone(27), the elastic rib springs back to the initial state. Once the rotation-stopping flange has been trapped in the flange-rotation-allowable zone, the clockwise rotation is restricted by the stop rib(24) and the counterclockwise rotation is restricted by the stop tab(25a). The angle (θ) between the clockwise-most flange position and the counterclockwisemost flange position defines the flange rotation allowable zone(27).

For disassembly, a handle(25c) is provided on the elastic rib(25), to be pulled downward to the concave surface so as to be flush with the top of the stop tab, while turning the upper part counterclockwise until the selector flanges are aligned with the oval cutout(11). Then, the upper part is lifted up from the lower part of the stand. Here, the outside portion of the V-shaped stop rib(24) and the auxilary stop rib(28) blocks the rear portior of the rotation-stopping flange while the stop tab(25b) and the inner portion of the V-shaped stop rib blocks the front portion of the rotation-stopping flange, resulting in a balanced and evenly distributed stopping load on the flange.

The assembly process for the monitor and the upper part of the stand is explained below with reference to FIG. 5B.

After completing the monitor stand assembly, connection ribs(12) and hooks(13) provided on the upper part of the stand are inserted into the slots(3) and rectangular grooves (2) at the bottom of the monitor case. Then, the outer edge of the rib(14) of the upper part is made flush with the side of step(4) on the monitor rear bottom surface, so that they contact each other. Finally, a screw(17) is placed through the screw hole(15) and tightened to draw the stand assembly to the monitor. The connection ribs and hooks together with the rib(14) prevent the monitor from dislocation and drooping due to an external load.

Figure 6:
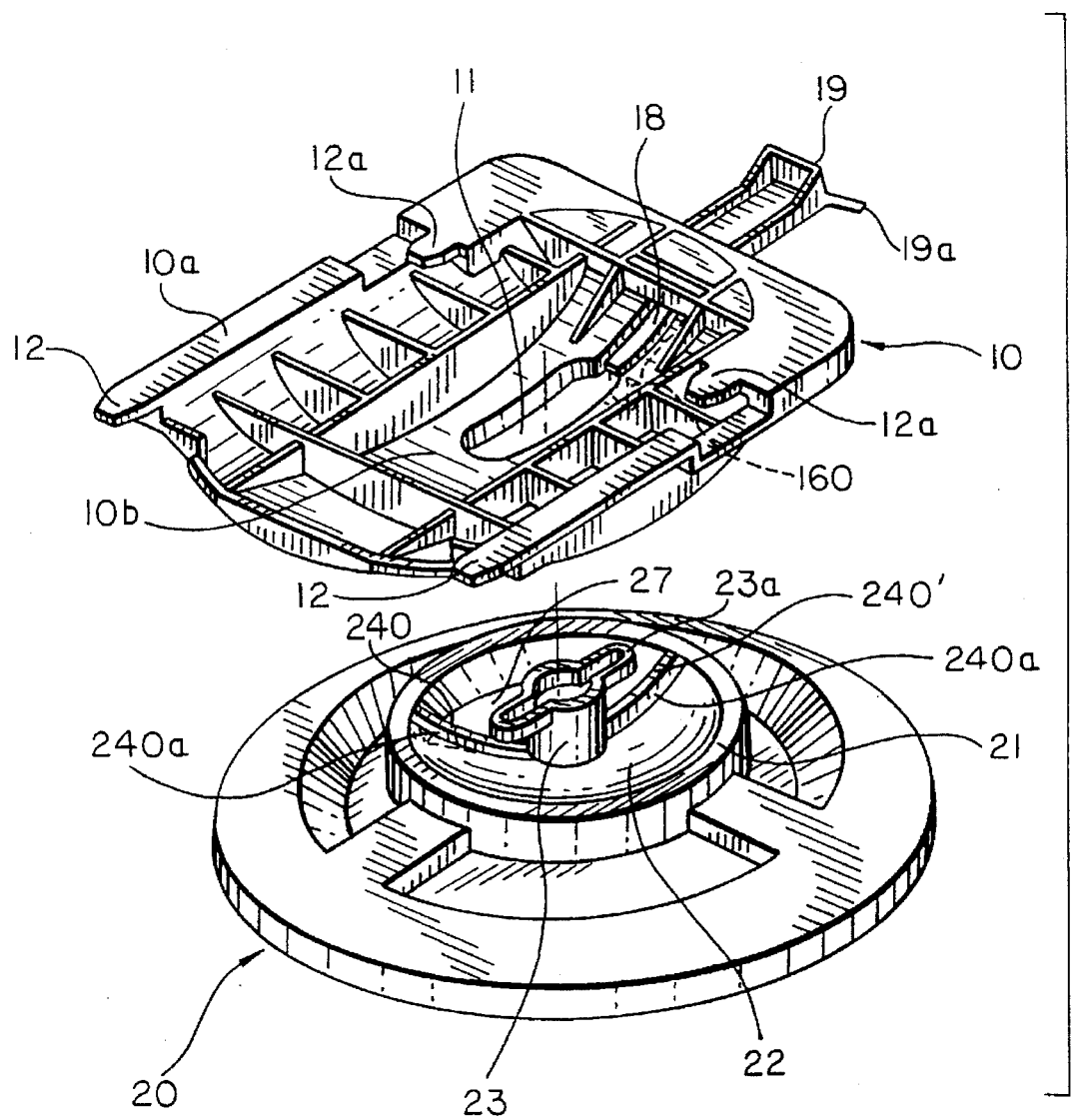
FIG. 6 is an exploded perspective view of the second preferred embodiment of the monitor stand assembly of the present invention.
Figure 7A:
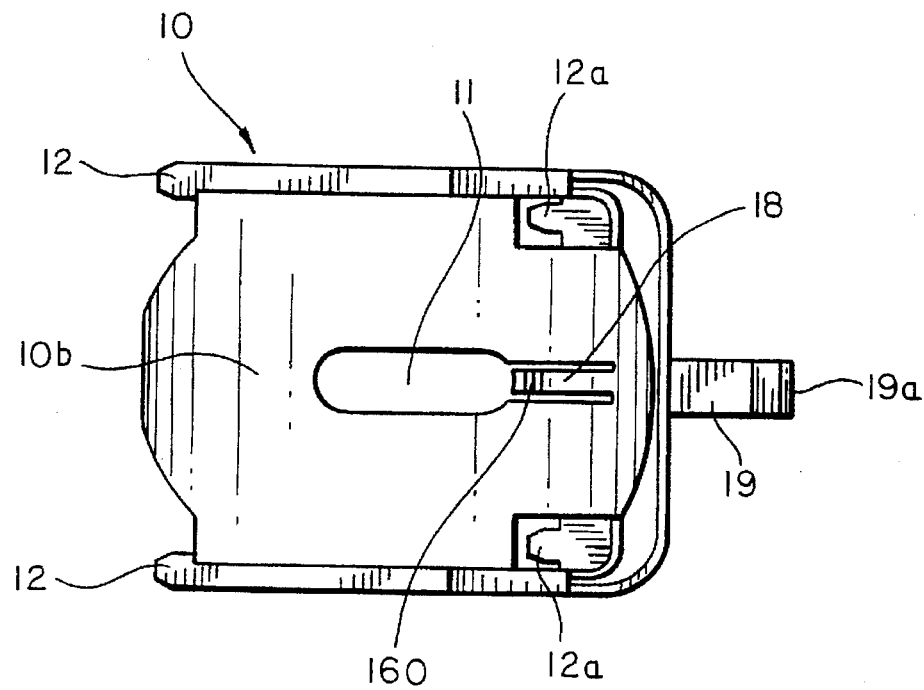
FIG. 7A and FIG. 7B show the bottom view of the monitor stand upper part and the top view of the monitor stand lower part of FIG. 6, respectively.
Figure 7B:
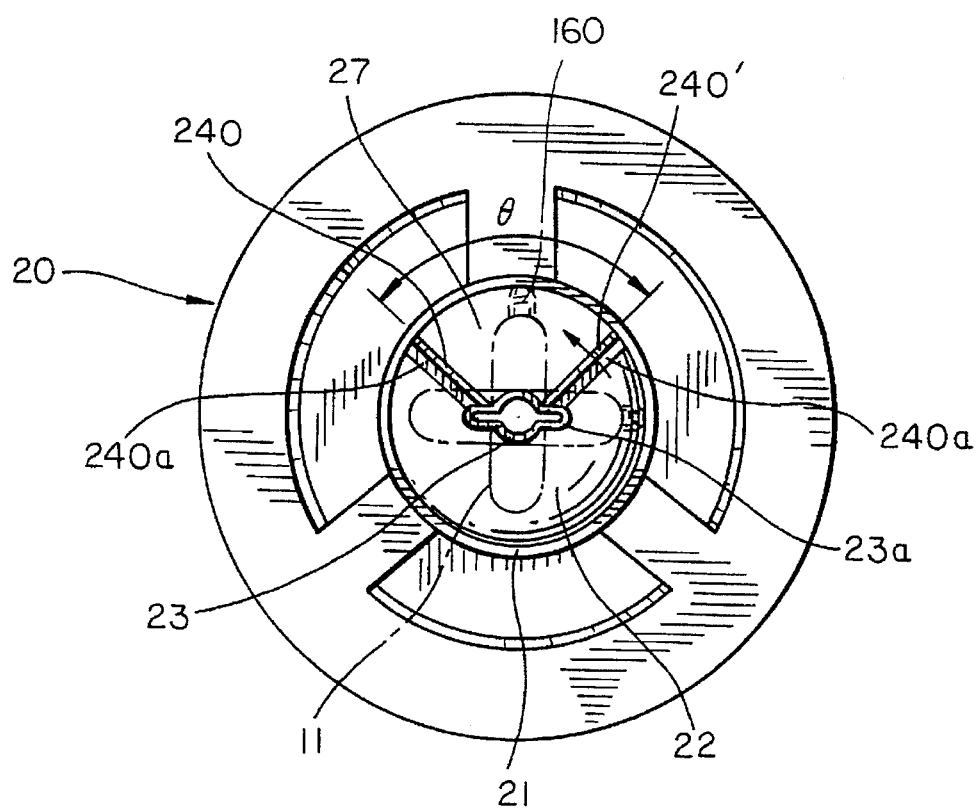
Figure 8:
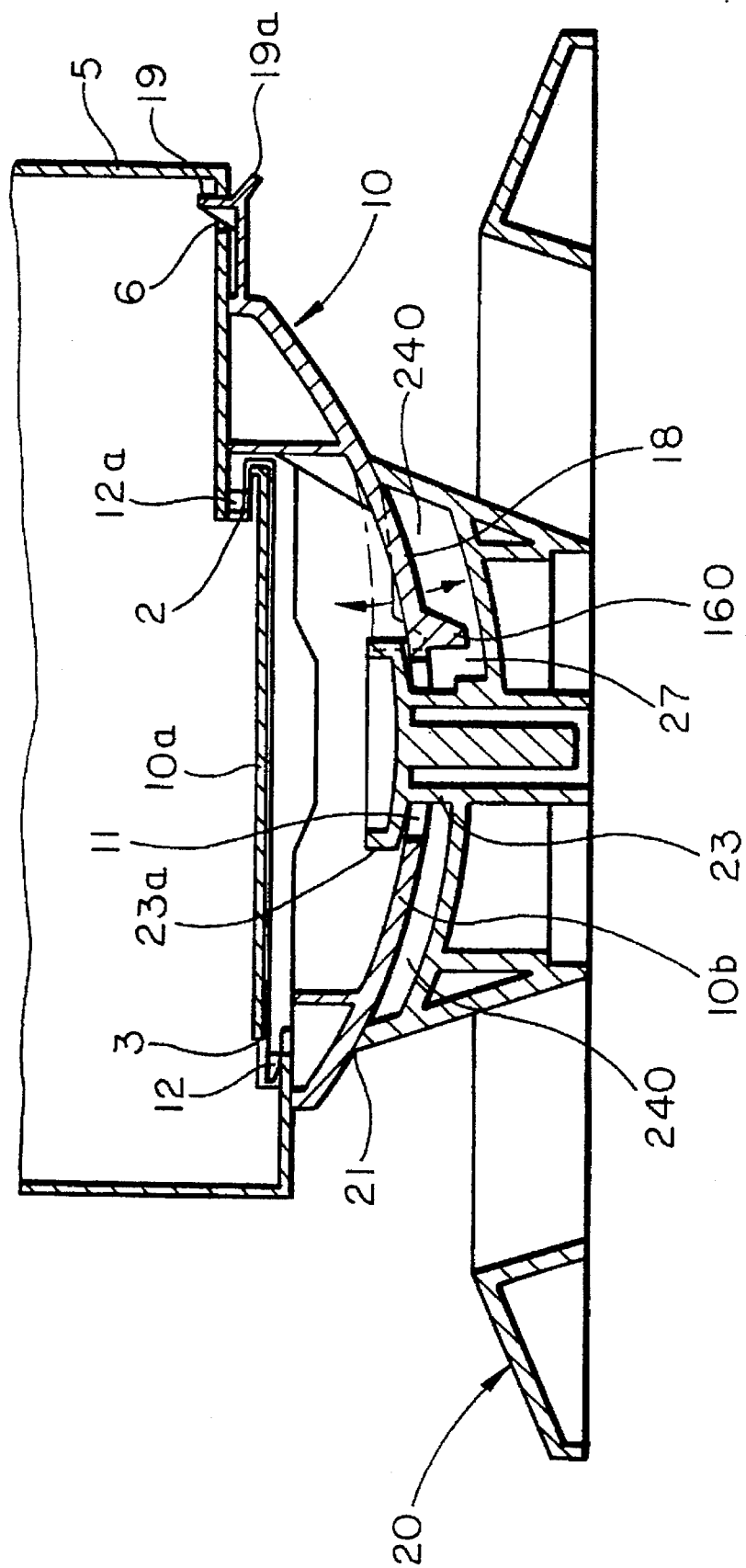
FIG. 8 is a cross-sectional view of the monitor stand assembly of FIG. 6 shown assembled.

FIGS. 6–8 illustrate a second preferred embodiment of the present invention. Here, the top flat portion(10a), concave portion(10b), oval cutout(11) and the pairs of connection ribs and hooks have a structure and function similar to those in the first preferred case.

The major differences of the second preferred embodiment for the upper part of the stand are the rotation-stopping flange(160) attached downward at the end of a tension pin 18 located at the oval cutout(11) and the addition of a snap(19) with a handle(19a). In the lower part of the stand, two stop ribs(240 and 240') form the flange-rotation-allowable zone (27) with a given rotation angle(θ). Ramps 240a are provided, filling the intersection of the concave surface and the outer side of the stop ribs, to help the rotation-stopping flange move over. Also, the base of the flange-rotation-allowable zone is lower than the concave surface to avoid interference with the rotation-stopping flange.

The assembly process of the monitor stand constructed as above is described below with references to FIG. 7B and FIG. 8.

First, the selector flanges(23) are inserted through the oval cutout(11) and the upper part is rotated either clockwise or counterclockwise, until the rotation-stopping flange on the tension pin moves over the ramps(240a) of the stop ribs(240 and 240') into the flange-rotation-allowable zone(27). Once the rotation-stopping flange reaches the interior of the flange-rotation-allowable zone, the tension pin springs back to the initial postion, thereby trapping the rotation-stopping flange between the stop ribs. Thus, the rotation stopper flange can rotate within the flange-rotation-allowable zone formed by the two stop ribs.

To detach the upper portion of the stand, the free end of the tension pin(18) is lifted and held to allow the rotation-stopping flange to pass over the stop ribs(240 and 240') and the upper part is rotated until the selector flanges are aligned with the oval cutout. Then, the upper part is lifted to seperate it from the free lower part.

To assemble the monitor and the stand, the connection ribs(12 and 12a) are inserted into slots at the bottom of the monitor. The snap(19) at the rear of the upper part is inserted into the connection groove to secure the monitor and prevent the stand from sliding rearward relative to the monitor.

For disassembly, the snap handle(19a) is pulled down to unlatch the monitor from the stand. Then, the stand assembly is slid rearward to detach it from the monitor.

As described above, the interlocking of the selector flanges with the oval cutout and the restriction of horizontal monitor rotation with flange-rotation-allowable zone(27) prevents the upper part of the stand from being detached from the lower part without losing the monitor positioning capability.

The fixed selector flanges pushing down the upper part generate a consistent frictional force between the concave surfaces of the upper and lower parts resulting in smooth adjustment as well as secure positioning of the monitor.

Another advantage of the present invention is the reduced number of assembly parts, which is accomplished by eliminating the additional member for connecting the upper and lower parts with a screw, resulting in cost reduction as well as improved productivity.

In addition, the present monitor stand prevents a monitor from drooping and dislocation, thereby improving the functionality of the monitor.

The above description is that of the preferred embodiments of the invention. Various alterations and changes can be made without departing from the spirit and broader aspects of the invention as set forth in the appended claims.

What is claimed is:

1. A monitor stand, for supporting a monitor and adjusting the monitor's position, said monitor stand comprising:

a first part for interlocking engagement on one side with a monitor and having an elongated opening centrally located therein;

a second part having a generally concave surface disposed on an opposite side of said first part, said second part having a position selector means projecting from a surface thereof for insertion within said elongated opening, said position selector means having selector flange means for loose interlocking engagement with said elongated opening to enable rotational movement of said first part with respect to said second part, said second part including first stop means and second stop means for defining a rotation-allowable zone for said first part; and rotation-stop flange means disposed on said opposite side of said first part and projecting therefrom between said first stop means and second stop means for permitting said rotation of said first part within said rotation-allowable zone, wherein said first stop means is a stop rib and said second stop means is an elastic rib, both said stop rib and said elastic rib being arranged at a given angle on the concave surface of said second part to define said rotation-allowable zone.

2. The monitor stand as claimed in claim 1, wherein said rotation-stop flange means is disposed on one side of said elongated opening and substantially parallel thereto.

3. The monitor stand as claimed in claim 1, wherein the stop rib is V-shaped.

4. The monitor stand as claimed in claim 1, wherein said elastic rib has a free end toward said rotation-allowable zone and a stop tab with a ramp at the free end.

5. The monitor stand as claimed in claim 4, wherein a handle is provided on the bottom side of said elastic rib free end, for pulling the elastic rib downward.

6. The monitor stand as claimed in claim 1, wherein an auxilary stop rib is provided between said elastic rib and said stop rib on the concave surface of said second part.

* * * * *